(12) United States Patent
Miura et al.

(10) Patent No.: US 7,365,962 B2
(45) Date of Patent: Apr. 29, 2008

(54) CAPACITOR AND METHOD OF CONNECTING THE SAME

(75) Inventors: Teruhisa Miura, Uji (JP); Yoshio Miyazaki, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 196 days.

(21) Appl. No.: 10/532,849

(22) PCT Filed: Mar. 18, 2004

(86) PCT No.: PCT/JP2004/003655

§ 371 (c)(1),
(2), (4) Date: Apr. 27, 2005

(87) PCT Pub. No.: WO2004/084246

PCT Pub. Date: Sep. 30, 2004

(65) Prior Publication Data

US 2006/0034036 A1    Feb. 16, 2006

(30) Foreign Application Priority Data

Mar. 19, 2003 (JP) ............................. 2003-075676
Mar. 19, 2003 (JP) ............................. 2003-075677

(51) Int. Cl.
*H01G 9/10* (2006.01)
(52) U.S. Cl. ................. 361/537; 361/301.1; 361/301.2; 361/518; 361/519; 361/536; 361/537
(58) Field of Classification Search ............. 361/301.3, 361/523–530, 516–520, 301.2, 536–538, 361/301.1, 503–512
See application file for complete search history.

(56) References Cited

U.S. PATENT DOCUMENTS

| | | | | |
|---|---|---|---|---|
| 5,587,869 A | * | 12/1996 | Azumi et al. | 361/301.3 |
| 5,683,834 A | * | 11/1997 | Fujimoto et al. | 429/221 |
| 6,064,563 A | * | 5/2000 | Yamada et al. | 361/521 |
| 6,181,543 B1 | * | 1/2001 | Kobayashi et al. | 361/301.3 |
| 6,292,348 B1 | * | 9/2001 | Lin | 361/301.3 |
| 6,310,756 B1 | * | 10/2001 | Miura et al. | 361/301.3 |

FOREIGN PATENT DOCUMENTS

| | | |
|---|---|---|
| JP | 64-57538 | 3/1989 |
| JP | 2-277221 | 11/1990 |
| JP | 4-3411 | 1/1992 |
| JP | 9-69473 | 3/1997 |

(Continued)

Primary Examiner—Nguyen T. Ha
(74) Attorney, Agent, or Firm—Pearne & Gordon LLP

(57) ABSTRACT

A capacitor includes a hollow capacitor element formed by rolling a pair of flat sheet-like electrodes and, with separators interposed therebetween, a bottom-closed metallic casing receiving the capacitor element and a drive electrolyte therein, and an opening-sealing plate sealing an opening portion of the metallic casing, the opening-sealing plate having an external connection terminal. A rubber-like elastic member is provided on a surface of the opening-sealing plate at a peripheral edge portion thereof, and an electrically-insulating layer is formed on the metallic casing to cover at least a region extending from the open end of the metallic casing to a recess provided for fixing the opening-sealing plate, and the rubber-like elastic member is pressed by the open end portion of the metallic casing.

8 Claims, 13 Drawing Sheets

FOREIGN PATENT DOCUMENTS

| | | |
|---|---|---|
| JP | 10-223477 | 8/1998 |
| JP | 10-275751 | 10/1998 |
| JP | 11-251190 | 9/1999 |
| JP | 2000-12405 | 1/2000 |
| JP | 2000-315632 | 11/2000 |
| JP | 2001-11658 | 1/2001 |
| JP | 2002-329485 | 11/2002 |

* cited by examiner ically-
CAPACITOR AND METHOD OF CONNECTING THE SAME

TECHNICAL FIELD

This invention relates to a capacitor of a large capacity used in various electronic equipments and also to a method of connecting such capacitors.

BACKGROUND ART

An electric double-layer capacitor of such a construction as shown for example in FIGS. 18 and 19 has been proposed as a capacitor of a large capacity. As shown in FIG. 18, in this electric double-layer capacitor, a capacitor element 31 is contained in a metallic casing 36 with a closed bottom, and after a drive electrolyte is impregnated into this capacitor element 31, the capacitor element 31 is put into the bottom-closed metallic casing 36, and an opening portion thereof is sealed by an opening-sealing member 37. The outside of the metallic casing 36 is covered with a synthetic resin-made sleeve 38.

As shown in FIG. 19, in the capacitor element 31, sheet-like polarizable electrodes 32a and 33a, each formed by mixing and kneading, for example, activated carbon, carbon and polytetrafluoroethylene (PTFE) as a binder together, are bonded by an electrically-conductive adhesive respectively to foil-like, sheet-like or mesh-like metal current collectors 32b and 33b to which lead-out leads have already been fixed, thereby forming electrode members 32 and 33, and the pair of electrode members are wound into a roll via separators 34 and 35.

The current collectors 32b and 33b are made larger in width than the sheet-like polarizable electrodes 32a and 33a to provide protruding lead portions 32c and 33c, respectively, and during the winding operation, these protruding lead portions 32c and 33c are tilted toward the center of the capacitor element 31 (by swaging) to provide lead surfaces for surface-to-surface contact purposes.

With respect to upper and lower surfaces of the capacitor element 31 formed by swaging, the lower surface 32c is held in contact with an inner surface of a bottom surface portion 36a of the metallic casing 36, and the upper surface 33c is held in contact with an inner surface of an electrically-conductive terminal plate 39 extending through the opening-sealing member 37.

With respect to a method of sealing the opening-sealing member 37, a transverse drawn groove for retaining the opening-sealing member 37 is formed at the metallic casing 36, and after the opening-sealing member 37 is put on this transverse drawn groove, the open end portion of the metallic casing 36 is curled inwardly, thereby fixing the opening-sealing member 37. In order to further enhance the sealing effect, the curled open end portion of the metallic casing 36 bites into an annular rubber portion 40 provided at the opening-sealing member 37.

As a prior art literature relating to the invention of the present Application, there is known, for example, JP-A-10-275751.

However, in the above conventional large-capacity capacitor, the upper surface 33c of the capacitor element 31 serves as an anode lead surface while the lower surface 32c thereof serves as a cathode lead surface, and the lower surface 32c is electrically connected to the inner bottom surface 36a of the metallic casing 36, and therefore the metallic casing 36 is a cathode.

When this capacitor is used in a high-temperature and high-humidity environment, there is encountered a problem that the drive electrolyte leaks along the inner side surface of the metallic casing 36 to the exterior since the open end portion of the metallic casing 36, serving as the cathode, is disposed in biting engagement with the annular rubber portion 40 provided at the opening-sealing member 37.

With respect to this leakage, the metallic casing 36 is the cathode, and therefore hydroxide ions are produced at its sealed opening portion as a result of electrochemical reaction of the water content of the drive electrolyte, and the electrolyte exhibits a higher alkalinity due to the action of the hydroxide ions and positive ions of the electrolyte. The drive electrolyte, exhibiting the alkaline nature, moves along the inner side surface of the metallic casing 36 to deteriorate the rubber portion 40 held in contact with the open end portion, thereby lowering the sealing performance.

On the other hand, there are occasions when a plurality of capacitors are connected in series in order to enhance voltage-withstanding properties. In this case, a metallic casing of the first capacitor is plus, and the metallic casings of the second to last capacitors are alternately plus and minus.

When this metallic casing is plus, a current-collecting plate is minus. Here, also, when for example, tetraethylammonium fluoroborate is used as a solute of the drive electrolyte, tetrafluoroborate anions which are negative ions in the drive electrolyte approach the sealed opening portion, and a reaction, represented by (Chemical Formula 1), occurs, and then hydronium ions are produced by a reaction represented by (Chemical Formula 2), so that the drive electrolyte exhibits an acid nature.

$BF_4^- + H_2O \leftrightarrow BF_3(OH)^- + HF$ (Chemical Formula 1)

$HF + H_2O \rightarrow H_3O^+ + F^-$ (Chemical Formula 2)

The acid component of this drive electrolyte moves along the inner side surface of the metallic casing, and deteriorates the rubber portion held in contact with the open end portion, so that the sealing performance is lowered.

When the drive electrolyte thus leaks to the exterior, this has invited not only a problem that the lifetime of the capacitor is shortened but also a problem that when the drive electrolyte deposits in a bridging manner on positive and negative portions of a wiring pattern on a printed circuit board, a malfunction of the circuit is incurred since the drive electrolyte, leaking to the exterior, has ion-conductive properties.

This invention seeks to solve the above conventional problems, and an object of the invention is to provide a capacitor of a large capacity in which a drive electrolyte will not leak to the exterior even when the capacitor is used for a long period of time in a high-temperature and high-humidity environment, and also to provide a method of connecting the capacitors.

DISCLOSURE OF THE INVENTION

In order to solve the above problems, the invention of claim 1 provides a capacitor comprising a hollow capacitor element formed by rolling a pair of flat sheet-like electrodes, with separators interposed therebetween, a bottom-closed metallic casing receiving the capacitor element and a drive electrolyte therein, and an opening-sealing plate sealing an opening portion of the metallic casing, the opening-sealing plate having an external connection terminal, wherein a rubber-like elastic member is provided on a surface of the opening-sealing plate at a peripheral edge portion thereof, and an electrically-insulating layer formed on the metallic casing to cover at least a region extending from the open end of the metallic casing to a recess provided for fixing the opening-sealing plate, and the rubber-like elastic member is pressed by the open end portion of the metallic casing. With this construction, the side surface of the opening-sealing plate can be held in intimate contact with the inner side surface of the metallic casing, and therefore the drive electrolyte will not move along the inner side surface of the metallic casing, and besides the sealed opening portion of the metallic casing is insulated by the electrically-insulating layer, and therefore an electrochemical reaction of the water content of the drive electrolyte will not occur, and there is obtained an operational effect that the reliability of the sealing can be enhanced during a long-term use.

The invention of claim 2, depending from claim 1, is directed to a construction in which the capacitor element has lead-out leads connected respectively to the pair of electrodes, and an end surface of one of the electrodes projects in a direction opposite to a direction of projecting of the lead-out leads. With this construction, heat, generated within the capacitor during the charging and discharging of the capacitor, can be easily radiated to the metallic casing via the projecting electrode end surface portion of the capacitor element, and therefore there is obtained an operational effect that heat can be easily radiated to the exterior.

The invention of claim 3, depending from claim 1, is directed to a construction in which end surfaces of the pair of electrodes of the capacitor element are projected in opposite directions, respectively, and lead-out leads are connected respectively to flat surface portions of the end surfaces of the electrodes. With this construction, the contact resistance, developing between the capacitor element and the lead-out lead, is reduced, and heat, generated within the capacitor, can be easily radiated to the metallic casing via the projecting end surface portions of the capacitor element, and therefore there is obtained an operational effect that heat can be easily radiated to the exterior.

The invention of claim 4, depending from claim 3, is directed to a construction in which an electrically-insulating plate is provided between the two lead-out leads. With this construction, there are obtained operational effects that the short-circuiting between the lead-out leads is prevented and that the excellent ability to withstand mechanical vibration and so on is achieved.

The invention of claim 5, depending from claim 1, is directed to a construction in which the electrically-insulating layer is made of a polyaminoamide compound or a modified olefin resin. Both of the poyaminoamide compound and the modified olefin resin produce a strong bonding force for metal, and are stable for alkalis and acids, and therefore the deterioration of the electrically-insulating layer is suppressed, and besides the chemical deterioration of the rubber-like elastic member, comprising a rubber material as a main component, can be suppressed, and therefore there is obtained an operational effect that the reliability of the sealing can be enhanced during a long-term use.

The invention of claim 6, depending from claim 1, is directed to a construction in which the pair of flat sheet-like electrodes have polarizable electrode layers formed respectively on surfaces of current collectors each composed of a metallic foil or an electrically-conductive polymer, the polarizable electrode layer being composed of a mixture comprising at least activated carbon, a binding agent and an electrically-conducting agent. With this construction, this capacitor can be used as an electric double-layer capacitor utilizing an electric double layer formed at an interface of the polarizable electrode layers, and there is obtained an operational effect that there can be obtained the capacitor which can be used as a device for automotive electrical equipments which is required to have a large capacity and also to be reliable for a long period of time.

The invention of claim 7, depending from claim 1, is directed to a construction in which a metallic foil, having a metal oxide film formed on a surface thereof, is used in at least one of the pair of flat sheet-like electrodes. With this construction, when the metallic material of the electrode is, for example, aluminum, this capacitor can be used as an aluminum electrolytic capacitor, and can be used as an aluminum electrolytic capacitor mainly for an inverter circuit requiring high ripple current, and there are obtained an operational effect that as compared with conventional aluminum electrolytic capacitors, this capacitor is reliable for a longer period of time, and also reduces the amount of heat generated from the product upon application of a large current.

The invention of claim 8, depending from claim 1, is directed to a construction in which projections for positioning and/or fixing a center portion of the capacitor element are formed on an inner bottom surface of the metallic casing and the opening-sealing plate, respectively, thereby providing a porous structure. With this construction, when vibrations are applied to the capacitor from the exterior, stresses for the joined portion between the end surface of the capacitor element and the metallic casing can be reduced, and therefore there are obtained operational effects that the vibration-withstanding ability of the product is enhanced and that even when heat is generated within the capacitor during use, the ability of radiating heat to the exterior can be enhanced.

The invention of claim 9, depending from claim 1, is directed to a construction in which a hollow core member is provided at a center portion of the capacitor element. With this construction, the core member which is made, for example, of an insulative polymer serves as a winding core around which the capacitor element is to be wound, and therefore the capacitor element can be more tightly wound on the core member as compared with the case where such core member is not used, and the distance between the electrodes can be shortened, and therefore the weaving of the roll is reduced, and also an internal resistance is reduced. And besides, even when vibrations are applied to the capacitor from the exterior, stresses for the electrode end surfaces of the capacitor element can be reduced, and therefore there is obtained an operational effect that the vibration-withstanding ability of the product can be enhanced.

In the case where the core member is made of metal, the ability to radiate heat, generated within the capacitor during use, to the exterior can be enhanced.

The invention of claim 10, depending from any one of claims 1 to 3, is directed to a construction in which a tapering thickened wall portion is provided in contacting relation to an inner bottom surface and an inner side surface of the metallic casing. With this construction, when the electrode end surface of the capacitor element is pressed against the inner bottom surface of the metallic casing, the electrode end surface of the capacitor element can be easily gathered onto that portion of the inner bottom surface of the metallic casing to which the electrode end surface is to be electrically connected. Therefore, a variation in connecting resistance, developing between the capacitor element and the metallic casing, can be made more stable, and there is obtained an operational effect that a variation in resistance of the product can be reduced.

The invention of claim 11, depending from claim 1, is directed to a construction in which electrode end surfaces of the capacitor element project in opposite directions, respectively, and one of the electrode end surfaces of the capacitor element is electrically connected to an inner bottom surface of the metallic casing, and there is provided a current-collecting plate having an external connection terminal electrically connected to the other electrode end surface of the capacitor element, and the external connection terminal of the current-collecting plate extends through the opening-sealing plate. With this construction, the side surface of the opening-sealing plate can be held in intimate contact with the inner side surface of the metallic casing, and therefore the drive electrolyte will not move along the inner side surface of the metallic casing, and besides the inner side of the sealed opening portion of the metallic casing is insulated by the electrically-insulating layer, and therefore an electrochemical reaction of the water content of the drive electrolyte will not occur. Furthermore, heat, generated within the capacitor during the charging and discharging of the capacitor, can be easily radiated to the metallic casing via the projecting electrode end surfaces of the capacitor element, so that heat can be easily radiated to the exterior, and therefore there is obtained an operational effect that the reliability of the sealing can be enhanced during a long-term use.

The invention of claim 12, depending from claim 11, is directed to a construction in which an external connection terminal is provided at an outer bottom surface of the metallic casing. When the capacitors are connected together or when the capacitor is incorporated into a device, there are obtained operational effects that the contact resistance is reduced and that the excellent ability to withstand mechanical vibration and so on is achieved.

For example, the external connection terminal has a cylindrical shape having a threaded portion formed therein, or a flat plate-shape having a mounting hole formed in a central portion thereof.

The invention of claim 13, depending from claim 11 or claim 12, is directed to a construction in which the current-collecting plate, having the external connection terminal, is an opening-sealing current-collecting plate which is made of metal, and serves also as the opening-sealing plate. With this construction, the opening-sealing plate and the current-collecting plate are combined into an integral construction, and therefore there is obtained an operational effect that the number of the component parts of the capacitor can be reduced, and at the same time the height of the capacitor can be reduced.

Here, for example, the external connection terminal has a cylindrical shape having a threaded portion formed on an outer surface thereof, or a flat plate-shape having a mounting hole formed in a central portion thereof.

The invention of claim 14, depending from any one of claims 11 to 13, is directed to a construction in which an annular convex portion is formed on a peripheral edge portion of a surface of the opening-sealing plate or the opening-sealing current-collecting plate disposed in contact with the rubber-like elastic member. With this construction, the sealing is effected in such a manner that the rubber-like elastic member is firmly held between the annular convex portion, formed on the opening-sealing plate, and the curled open end portion of the metallic casing, and therefore there is obtained an operational effect that the reliability of the sealing can be enhanced during a long-term use.

The invention of claim 15, depending from claim 11 or claim 12, is directed to a construction in which a sealing member is provided in a through hole portion of the opening-sealing plate disposed in contact with the external connection terminal of the current-collecting plate. With this construction, the through hole of the opening-sealing plate through which the external connection terminal of the current-collecting plate is exposed can be positively sealed, and therefore there is obtained an operational effect that the drive electrolyte within the metallic casing will not leak to the exterior.

The invention of claim 16, depending from claim 15, is directed to a construction in which an electrically-insulating layer is formed on that surface of the external connection terminal of the current-collecting plate held in contact with the through hole portion of the opening-sealing plate. With this construction, there is obtained an operational effect that the operational effect, obtained by the invention of claim 15, can be further enhanced.

The invention of claim 17, depending from claim 13, is directed to a construction in which an annular convex portion is formed on an outer peripheral portion of that side of the opening-sealing current-collecting plate to be joined to the capacitor element, and an electrically-insulating layer is provided on the outer peripheral portion including the annular convex portion. With this construction, there are obtained operational effects that the acidification of the drive electrolyte, occurring in the vicinity of the outer peripheral portion of the opening-sealing current-collecting plate, is suppressed and that the chemical deterioration of the rubber-like elastic member is prevented.

The annular convex portion is formed on the outer peripheral portion of that side of the opening-sealing current-collecting plate to be joined to the capacitor element, and with this construction, when the opening-sealing current-collecting plate is to be pressed against the electrode end surface of the capacitor element after the capacitor element is introduced into the metallic casing, the electrode end surface of the capacitor element can be easily gathered onto that portion of the opening-sealing current-collecting plate to which the electrode end surface is to be electrically connected. Therefore, a variation in connecting resistance, developing between the capacitor element and the opening-sealing current-collecting plate, can be made more stable, so that a variation in resistance of the product can be suppressed.

The annular convex portion, provided at the opening-sealing current-collecting plate, can perform its effect when the angle of this annular convex portion (toward the center of the capacitor element) with respect to the outer peripheral surface of the capacitor element is in the range of between 5° and 85°.

The invention of claim 18, depending from any one of claims 11 to 13, is directed to a construction in which a projection for positioning and/or fixing a center portion of the capacitor element is formed on at least one of an inner bottom surface of the metallic casing, the current-collecting plate and the opening-sealing current-collecting plate. With this construction, when vibrations are applied to the capacitor from the exterior, stresses for the electrode end surfaces of the capacitor element can be reduced, and therefore there are obtained operational effects that the vibration-withstanding ability of the product can be enhanced and that even when heat is generated within the capacitor during use, the ability of radiating heat to the exterior can be enhanced.

The invention of claim 19, depending from any one of claims 11, 16 and 17, is directed to a construction in which the electrically-insulating layer is made of a polyaminoamide compound or a modified olefin resin. Both of the poyaminoamide compound and the modified olefin resin produce a strong bonding force for metal, and are stable to alkalis and acids, and therefore the deterioration of the electrically-insulating layer is suppressed, and besides the chemical deterioration of the rubber-like elastic member, comprising a rubber material as a main component, can be suppressed, and therefore there is obtained an operational effect that the reliability of the sealing can be enhanced during a long-term use.

The invention of claim 20, depending from any one of claims 11 to 13, is directed to a construction in which the pair of flat sheet-like electrodes have polarizable electrode layers formed respectively on surfaces of current collectors except electrode end surface portions, the current collector being composed of a metallic foil or an electrically-conductive polymer, and the polarizable electrode layer being composed of a mixture comprising at least activated carbon, a binding agent and an electrically-conducting agent. With this construction, this capacitor can be used as an electric double-layer capacitor utilizing an electric double layer formed at an interface of the polarizable electrode layers, and there is obtained an operational effect that there can be obtained the capacitor which can be used as a device for automotive electrical equipments which is required to have a large capacity and also to be reliable for a long period of time.

The invention of claim 21, depending from any one of claims 11 to 13, is directed to a construction in which a metallic foil, having a metal oxide film formed on a surface thereof, is used in at least one of the pair of flat sheet-like electrodes. With this construction, when the metallic material of the electrode is, for example, aluminum, this capacitor can be used as an aluminum electrolytic capacitor, and can be used as an aluminum electrolytic capacitor mainly for an inverter circuit requiring high ripple current, and there are obtained an operational effect that as compared with conventional aluminum electrolytic capacitors, this capacitor is reliable for a longer period of time, and also reduces the amount of heat generated from the product upon application of a large current.

The invention of claim 22, depending from any one of claims 11 to 13, is directed to a construction in which a hollow core member is provided at a center portion of the capacitor element. With this construction, the core member which is made, for example, of an insulative polymer, serves as a winding core around which the capacitor element is to be wound, and therefore the capacitor element can be more tightly wound on the core member as compared with the case where such core member is not used, and the distance between the electrodes can be shortened, and therefore the weaving of the roll is reduced, and also an internal resistance is reduced. And besides, even when vibrations are applied to the capacitor from the exterior, stresses for the electrode end surfaces of the capacitor element can be reduced, and therefore there is obtained an operational effect that the vibration-withstanding ability of the product can be enhanced.

In the case where the core member is made of metal, the ability to radiate heat, generated within the capacitor during use, to the exterior can be enhanced.

The invention of claim 23, depending from any one of claims 11 to 13, is directed to a construction in which a tapering thickened wall portion is provided in contacting relation to the inner bottom surface and inner side surface of the metallic casing. With this construction, when the electrode end surface of the capacitor element is pressed against the inner bottom surface of the metallic casing, the electrode end surface of the capacitor element can be easily gathered onto that portion of the inner bottom surface of the metallic casing to which the electrode end surface is to be electrically connected. Therefore, a variation in connecting resistance, developing between the capacitor element and the metallic casing, can be made more stable, and there is obtained an operational effect that a variation in resistance of the product can be reduced.

The invention of claim 24 is directed to a connecting method of connecting a plurality of capacitors as defined in claim 11, which employs a connecting method in which the capacitors are connected together at outer bottom surfaces or outer side surfaces of their respective metallic casings by brazing and/or welding. With this method, even when the capacitors are connected in series, the reliability of the sealing performance of each of the capacitors can be maintained, and therefore the leakage of the drive electrolyte can be prevented. Even when mechanical stresses are applied to the capacitors, the connected portion will not be broken, and the cutting of the wiring will not occur, and therefore there is obtained an operational effect that the efficiency of the connecting operation can be markedly enhanced.

When inert gas arc welding is used as welding, the connection can be effected with a higher strength since no oxide is present in the connecting portions connected together by metallic bond.

When inert gas arc welding is effected after applying brazing, the connection can be carried out more effectively as compared with the case where one of the two is used alone.

Examples of the inert gas arc welding includes a TIG welding method and an MIG welding method, and either of the two methods can be used in the invention.

The invention of claim 25, depending from claim 24, is directed to a method in which the connection is effected, using a connecting member. By using the connecting member, the connection is effected in a plane, and there is obtained an operational effect that the strength against mechanical stresses can be increased.

The invention of claim 25, depending from claim 1 or claim 11, is directed to a construction in which the electrically-insulating layer is made of acryl-melamine resin. With this construction, the high strength of bonding of the electrically-insulating layer to the metallic casing is obtained. For example, acryl-melamine resin is dissolved in a mixed solvent comprising water, isopropyl alcohol and butycellosolve, and while the temperature of the mixed solvent is maintained at 21±2° C., the open end portion of the metallic casing and its vicinity are immersed in the mixed solvent, and a voltage of 150±50V is applied for 2 to 5 minutes, with the metallic casing serving as one pole. By doing so, the electrically-conductive layer, firmly bonded to the metallic casing, can be formed, so that the separation of the metallic casing and the electrically-insulating layer from each other at the interface will not occur for a long period of time, and therefore there is obtained an operational effect that the reliability of the sealing can be enhanced even during a long-term use.

The invention of claim 27, depending from any one of claims 1, 5, 11, 16, 17, 19 and 26, is directed to a construction in which as a pretreatment for providing the electrically-insulating layer on the metallic casing, at least one of a degreasing treatment, a surface-roughening treatment and an oxide film-forming treatment is applied to the metallic casing. With this construction, a high strength of bonding between the metallic casing and the electrically-insulating layer is obtained when any one of the above treatments is carried out. For example, when the degreasing treatment is not applied, an oil film may be formed between the metallic casing and the resin, and when the drive electrolyte causes oil of the oil film to flow into or out of the product after the product is produced, the separation of the metallic casing and the resin from each other at the interface is liable to occur. Therefore, it is necessary to remove the oil film by the degreasing treatment. When the surface-roughening treatment is applied to the metallic casing, the surface of the metallic casing is made coarse, so that the electrically-insulating layer is made less liable to be separated from the metallic casing because of an anchor effect. For effecting the oxide film-forming treatment, the metallic casing is made of an aluminum material, and the open end portion and its vicinity are immersed in a solution of $16\pm1$ W/V % sulfuric acid while a liquid temperature is maintained at $21\pm2°$ C., and a voltage of $15\pm3$V is applied for about 40 minutes at a current density of $110\pm40$ A/m$^2$, with the metallic casing serving as an anode. By doing so, the porous metal oxide film of a honeycomb structure can be formed. This oxide film is porous, and therefore the electrically-insulating layer is less liable to be separated from the metallic casing because of an anchor effect. When there is used modified polypropylene in which a hydroxyl group is formed at a terminal of a polymer chain, the more firmly-bonded electrically-insulating layer can be obtained because of the hydrogen bonding between the hydroxyl group and oxygen of the metal oxide film, and therefore there is obtained an operational effect that the reliability of the sealing can be enhanced even during a long-term use.

The invention of claim 28, depending from claim 1 or claim 11, is directed to a construction in which the electrically-insulating layer is an anodized aluminum layer.

With this construction, the electrically-insulating layer is provided at the opening portion of the metallic casing and its vicinity. For example, the metallic casing is made of an aluminum material, and the open end portion and its vicinity are immersed in a solution of $14\pm1$ W/V % sulfuric acid while a liquid temperature is maintained at $21\pm2°$ C., and a voltage of $15\pm3$V is applied for about 40 minutes at a current density of $110\pm40$ A/m$^2$, with the metallic casing serving as an anode. By doing so, the anodized aluminum layer can be formed. However, this anodized aluminum layer has defective portions, and in order to seal the defective portions, that portion, having the anodized aluminum layer formed thereon, is immersed, for example, in an aqueous solution, which contains $5.5\pm0.5$ g/L of nickel acetate and $1.5\pm0.5$ g/L of additive, and is maintained at a temperature of not lower than 90 degrees, for 10 to 20 minutes. By doing so, the defective portions are sealed, and as a result the anodized aluminum layer, that is, the electrically-insulating layer, having no defective portion, can be provided at the open end portion of the metallic casing and its vicinity, and therefore there is obtained an operational effect that the reliability of the sealing can be enhanced even during a long-term use.

The invention of claim 29, depending from claim 1 or claim 11, is directed to a construction in which the open end portion of the metallic casing is formed into a curved shape. With this construction, the open end portion of the metallic casing has a curved shape, and does not have an edge portion, and therefore the sufficient thickness of the electrically-insulating layer can be secured even at the open end portion. And besides, the opening is sealed by pressing the rubber-like elastic member against the open end portion of the metallic casing, and in the case where the open end portion of the metallic casing has an edge portion, the electrically-insulating layer is partially removed when a roller or the like is brought into contact with the open end portion of the metallic casing in a curling operation, and the alkali suppressing effect is lost at this removed portion. For example, when the drive electrolyte deposits on the electrically-insulating layer-removed portion during the production process, the drive electrolyte is alkalified or acidified to promote the deterioration of the rubber-like elastic member since the metallic casing has a polarity. In order to suppress this, the open end portion of the metallic casing is curved, and as a result even when the roller or the like is brought into contact with the open end portion of the metallic casing during the curling of this open end portion, the development of a defective portion in the electrically-insulating layer can be suppressed, and therefore there is obtained an operational effect that the reliability of the sealing can be enhanced.

Figure 1:
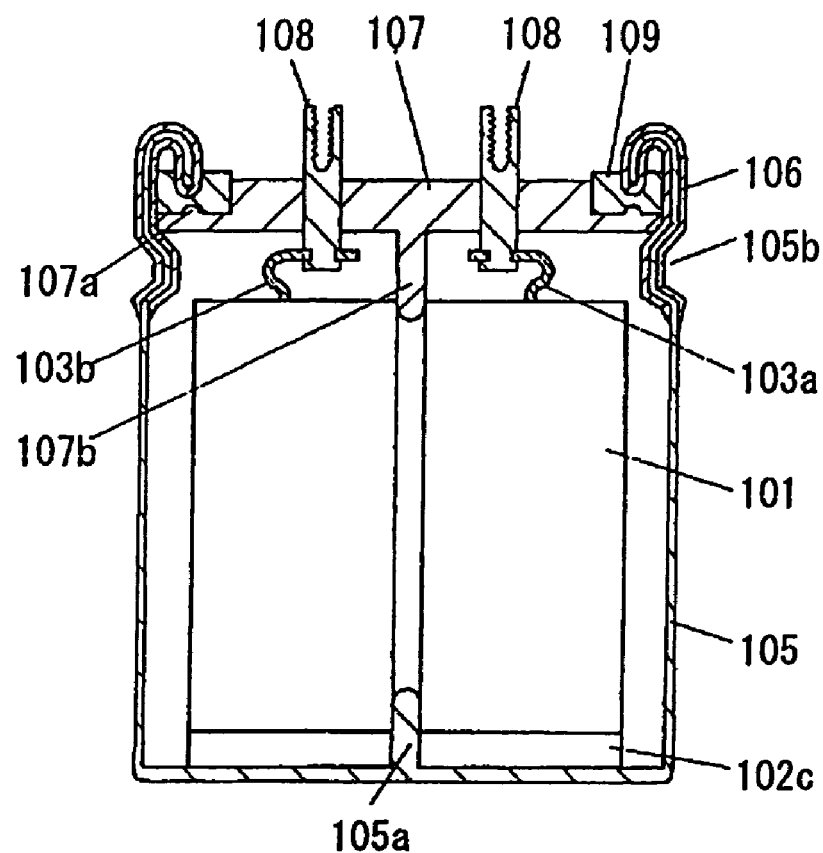
FIG. 1 is a cross-sectional view showing the construction of a first embodiment of a capacity of the present invention.

In the drawings, reference numeral 101 denotes a capacitor element, reference numerals 102*a* and 102*b* a pair of electrodes, reference numeral 102*c* an electrode end surface, reference numerals 103a and 103b lead-out leads, reference numeral 104 a separator, reference numeral 105 a metallic casing, reference numeral 105a a positioning projection, reference numeral 105b a recess, reference numeral 106 an electrically-insulating layer, reference numeral 107 opening-sealing plate, 107a an annular projection formed on the opening-sealing plate, reference numeral 107b a positioning projection, reference numeral 108 an external connection terminal, reference numeral 109 a rubber-like elastic member, reference numeral 201 a capacitor element, reference numeral 202 a current-collecting plate, reference numeral 202a a projection on the current-collecting plate, reference numeral 202b a concave portion in the current-collecting plate, reference numeral 202c a convex portion on the current-collecting plate, reference numeral 203 a metallic casing, reference numeral 203a a projection on an inner bottom surface of the metallic casing, reference numeral 203b a convex portion on the inner bottom surface of the metallic casing, reference numeral 203c a concave portion in the metallic casing, reference numeral 204 an electrically-insulating layer, reference numeral 205 an opening-sealing plate, reference numeral 205a a projection formed on a surface of the opening-sealing plate, reference numeral 205b a through hole, reference numeral 206 a rubber-like elastic member, reference numeral 207 a sealing member, and reference numerals 208a and 208b electrode end surfaces.

BEST MODE FOR CARRYING OUT THE INVENTION

Embodiments of the present invention will now be described with reference to the accompanying drawings.

First Embodiment

Figure 2:
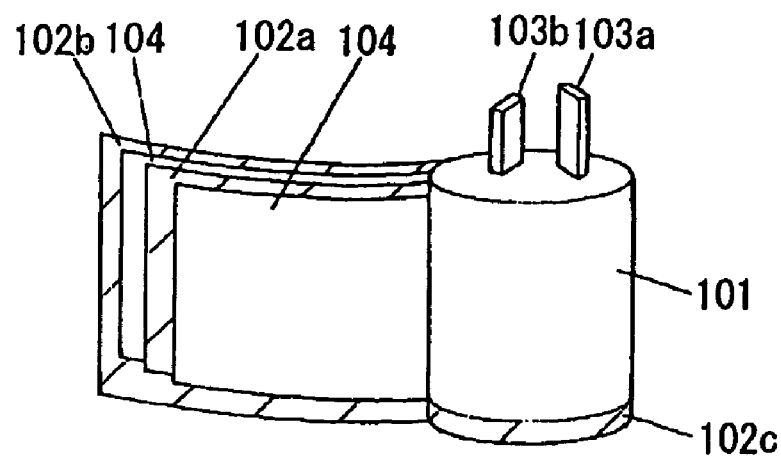
FIG. 2 is a developed, perspective view of a capacitor element thereof.

FIG. 1 is a cross-sectional view showing the construction of a first embodiment of a capacity of the invention, and FIG. 2 is a developed, perspective view of a capacitor element employed in this capacitor. In FIG. 1, reference numeral 101 denotes the capacitor element, and as shown in FIG. 2, this capacitor element 101 is obtained by connecting lead-out leads 103a and 103b respectively to a pair of electrodes 102a and 102b and then by winding these electrodes into a roll with separators 4 interposed therebetween in such a manner that one end surface 102c of one electrode 102b projects. Polarizable electrodes, each composed of a mixture comprising at least activated carbon, a binding agent and an electrically-conducting agent, are formed at the pair of electrodes 102a and 102b, respectively.

Reference numeral 105 denotes a tubular metallic casing with a closed bottom, and reference numeral 106 denotes an electrically-insulating layer formed on the metallic casing to cover at least a region extending from an open end of the metallic casing 105 to a recess 105b provided for fixing an opening-sealing plate 107.

A projection 105a for positioning the capacitor element 101 is formed on an inner bottom surface of the metallic casing 105.

The opening-sealing plate 107 includes an annular projection 107a formed on an outer surface thereof at a peripheral edge portion thereof, a projection 107b formed at a central portion thereof for positioning the capacitor element 101, and external connection terminals 108 for connection respectively to the lead-out leads 103a and 103b. Reference numeral 109 denotes a rubber-like elastic member provided at the opening-sealing plate 107.

In the capacitor of this first embodiment, the side surface of the opening-sealing plate 107 can be held in intimate contact with an inner side surface of the metallic casing 105, and therefore a drive electrolyte will not move along the inner side surface of the metallic casing 105, and besides even when the metallic casing 105 is a cathode, an electrochemical reaction of the water content of the drive electrolyte will not occur since the inner side of the sealed opening portion is insulated, and therefore the reliability of the sealing can be enhanced during a long-term use.

And besides, the projections 105a and 107b are formed on the inner bottom surface of the metallic casing 105 and the opening-sealing plate 107, respectively, and the positioning and/or fixing of the capacitor element 101 are effected by these projections 105a and 107b, and therefore even when vibrations are applied to the capacitor from the exterior, stresses for the capacitor element 101 can be reduced, and therefore the vibration-withstanding ability of the product can be enhanced, and also even when heat is generated within the capacitor during use, the ability of radiating heat to the exterior can be enhanced.

On the other hand, when there is provided a construction in which the metallic casing 105 is not provided with the electrically-insulating layer 106, hydroxide ions are produced at the sealed opening portion of the metallic casing 105 as a result of electrochemical reaction of the water content of the drive electrolyte since the metallic casing 105 is the cathode, and the electrolyte exhibits a higher alkalinity due to the action of the hydroxide ions and positive ions of the electrolyte. The drive electrolyte, exhibiting the alkaline nature, moves along the inner side surface of the metallic casing 105 to deteriorate the rubber-like elastic member 106 held in contact with the open end portion, thereby lowering the sealing performance.

In the capacitor of this first embodiment, the pair of electrodes 102a and 102b have the polarizable electrodes, respectively, and therefore this capacitor can be used as an electric double-layer capacitor utilizing an electric double layer formed at an interface of the polarizable electrodes, and this electric double-layer capacitor can be used as a device for automotive electrical equipments which is required to have a large capacity and also to be reliable for a long period of time.

In the case where an electrode foil, composed of a metal foil having a metal oxide film formed on a surface thereof, is used as one of the pair of flat sheet-like electrodes 102a and 102b of the capacitor element 101 serving as an anode, while a surface-roughened metal foil is used as the other electrode serving as a cathode, and the metal foil material is aluminum, then this capacitor can be used as an aluminum electrolytic capacitor, and can be used mainly for an inverter circuit requiring high ripple current, and as compared with conventional aluminum electrolytic capacitors, this capacitor is reliable for a longer period of time, and also reduces the amount of heat generated from the product upon application of a large current.

Figure 3:
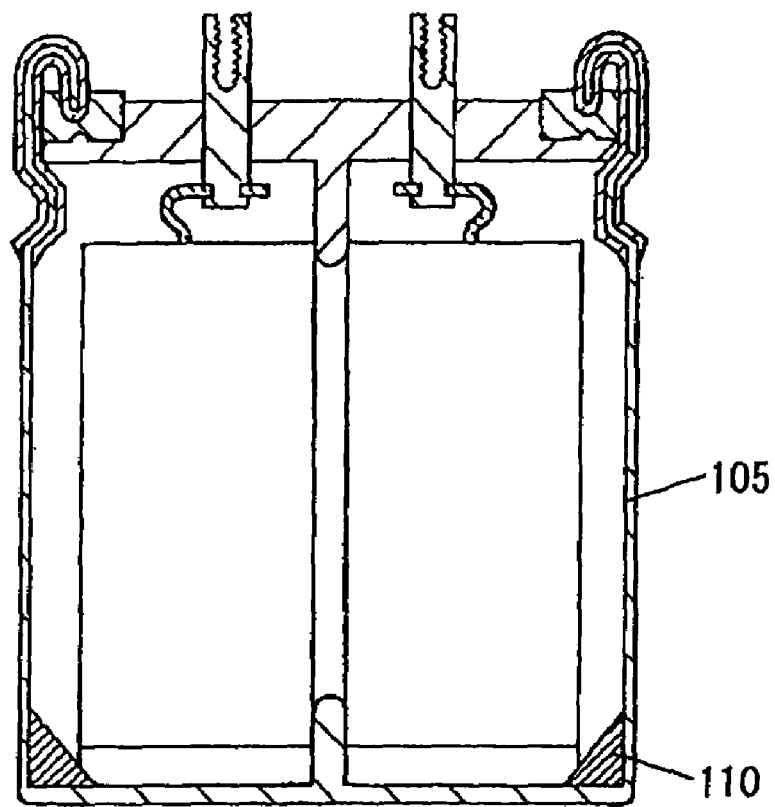
FIG. 3 is a cross-sectional view showing the construction of another metallic casing of the first embodiment.
Figure 4:
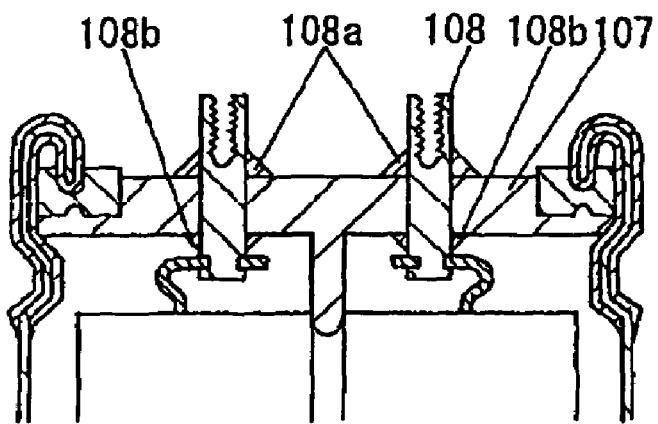
FIG. 4 is a cross-sectional view the construction of another external extension terminal portion of the first embodiment.

By providing a tapering thickened wall portion 110 at a region including the inner side surface and inner bottom surface of the metallic casing 105 as shown in FIG. 3, the end surface of the capacitor element 101 can be easily brought into a gathered condition, and therefore a variation in connecting resistance, developing between the capacitor element 101 and the metallic casing 105, can be reduced to a lower level, so that the stable capacitor can be obtained.

The angle of the above tapering (toward the center of the inner bottom surface) with respect to the inner side surface of the metallic casing 105 is in the range of between 5° and 85°.

By providing insulating resin layers 108a and 108b on the periphery of each of the pair of external connection terminals 108, moisture, tending to intrude into the capacitor, can be completely blocked, so that the capacitor of the long lifetime and high reliability can be obtained.

Although the insulating resin layers 108a and 108b are provided around the periphery of each of the pair of the external connection terminals 108, one of the insulating resin layers may be provided.

Second Embodiment

Figure 5:
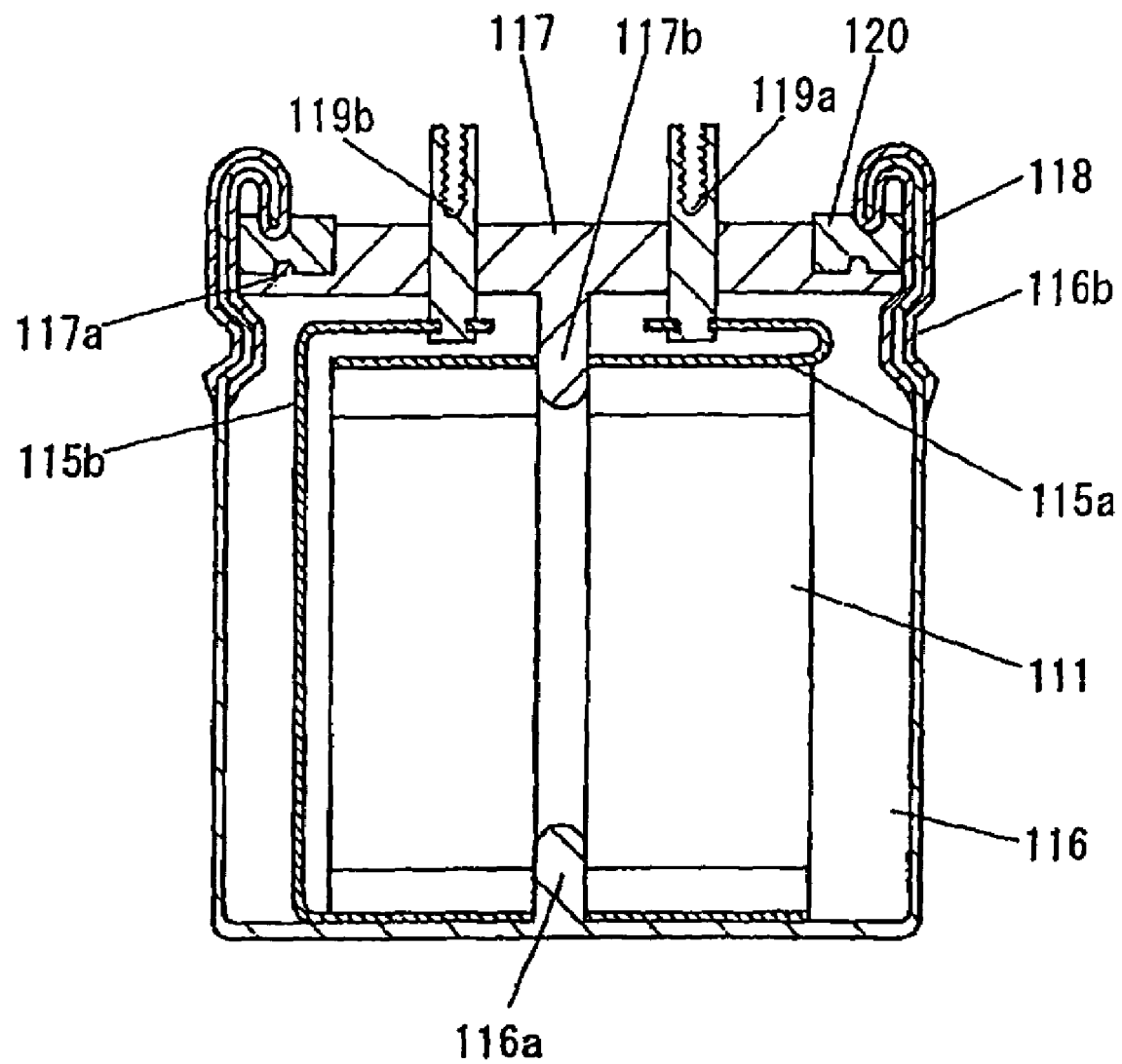
FIG. 5 is a cross-sectional view showing the construction of a second embodiment of a capacitor of the invention.
Figure 6:
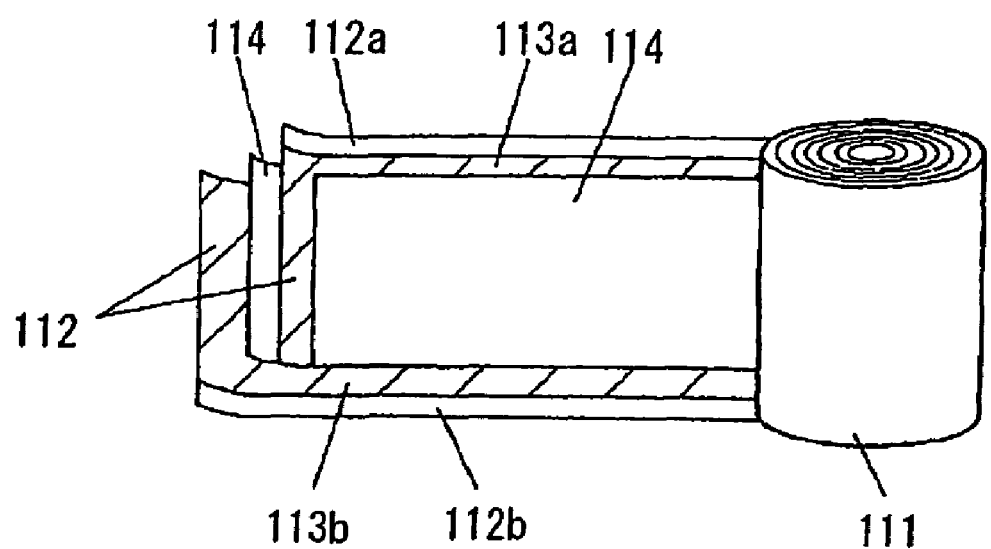
FIG. 6(*a*) is an developed, perspective view of a capacitor element thereof, and FIG. 6(*b*) is a perspective view thereof.
Figure 6:
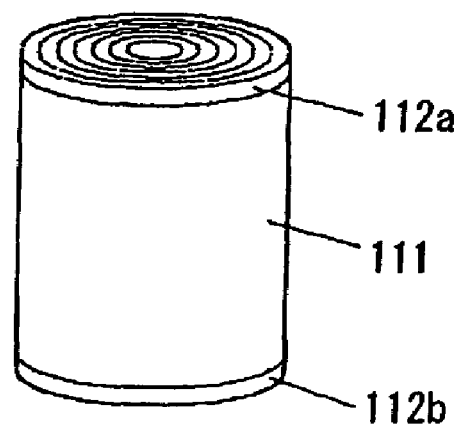

FIG. 5 is a cross-sectional view showing the construction of a second embodiment of a capacity of the invention, and FIGS. 6(a) and 6(b) are a developed, perspective view and a perspective view respectively of a capacitor element employed in this capacitor. In FIG. 5, reference numeral 111 denotes the capacitor element, and in this capacitor element 111, polarizable electrode layers 113a and 113b, each composed of a mixture comprising at least activated carbon, a binding agent and an electrically-conducting agent, are formed in such a manner that electrode end surfaces 112a and 112b of a pair of electrodes 112 project in opposite directions, respectively as shown in FIG. 6(a). The pair of electrodes 112 are wound into a roll, with separators 114 interposed therebetween, and by doing so, the capacitor element 111 as shown in FIG. 6(b) can be obtained.

Reference numerals 115a and 115b denote lead-out leads connected respectively to upper and lower flat surface portions of the electrode end surfaces 112a and 112b of the pair of electrodes 112, and reference numeral 116 denotes a tubular metallic casing with a closed bottom which is provided with an electrically-insulating layer 118 covering at least a region extending from an open end of this metallic casing to a recess 116b provided for fixing an opening-sealing plate 117. A projection 116a for positioning the capacitor element 111 is formed on an inner bottom surface of the metallic casing 116. Reference numeral 117 denotes the opening-sealing plate sealing the opening of the metallic casing 116, and this opening-sealing plate includes an annular projection 117a formed on an outer surface thereof at a peripheral edge portion thereof, a projection 117b formed at a central portion thereof for positioning the capacitor element 111, and external connection terminals 108 for connection respectively to the lead-out leads 115a and 115b. Reference numeral 120 denotes a rubber-like elastic member provided at the opening-sealing plate 117.

In the capacitor of this second embodiment, the side surface of the opening-sealing plate 117 can be held in intimate contact with an inner side surface of the metallic casing 116, and therefore a drive electrolyte will not move along the inner side surface of the metallic casing 116, and besides an electrochemical reaction of the water content of the drive electrolyte will not occur since the inner side of the sealed opening portion of the metallic casing 116 is insulated, and therefore the reliability of the sealing can be enhanced during a long-term use.

And besides, the projections 116a and 117b are formed on the inner bottom surface of the metallic casing 105 and the opening-sealing plate 117, respectively, and the positioning and/or fixing of the capacitor element 111 are effected by these projections 116a and 117b, and therefore even when vibrations are applied to the capacitor from the exterior, stresses for the capacitor element 111 can be reduced, and therefore the vibration-withstanding ability of the product can be enhanced, and also even when heat is generated within the capacitor during use, the ability of radiating heat to the exterior can be enhanced.

On the other hand, when there is provided a construction in which the metallic casing 116 is not provided with the electrically-insulating layer 118, hydroxide ions are produced at the sealed opening portion of the metallic casing 116 as a result of electrochemical reaction of the water content of the drive electrolyte since the metallic casing 116 is the cathode, and the electrolyte exhibits a higher alkalinity due to the action of the hydroxide ions and positive ions of the electrolyte. The drive electrolyte, exhibiting the alkaline nature, moves along the inner side surface of the metallic casing 116 to deteriorate the rubber-like elastic member 120 held in contact with the open end portion, thereby lowering the sealing performance.

Furthermore, it is not necessary to roll the capacitor element while controlling the positions of the lead-out leads 103a and 103b as in the capacitor element 101 of the first embodiment, and therefore the efficiency of the operation can be markedly enhanced.

Examples of the means for joining the lead-out leads 115a and 115b respectively to the upper and lower flat surface portions of the electrode end surfaces 112a and 112b include metallizing, welding, brazing and bonding employing an electrically-conductive adhesive.

This capacitor can be used as an electric double-layer capacitor and an aluminum electrolytic capacitor as described above for the first embodiment.

Third Embodiment

Figure 7:
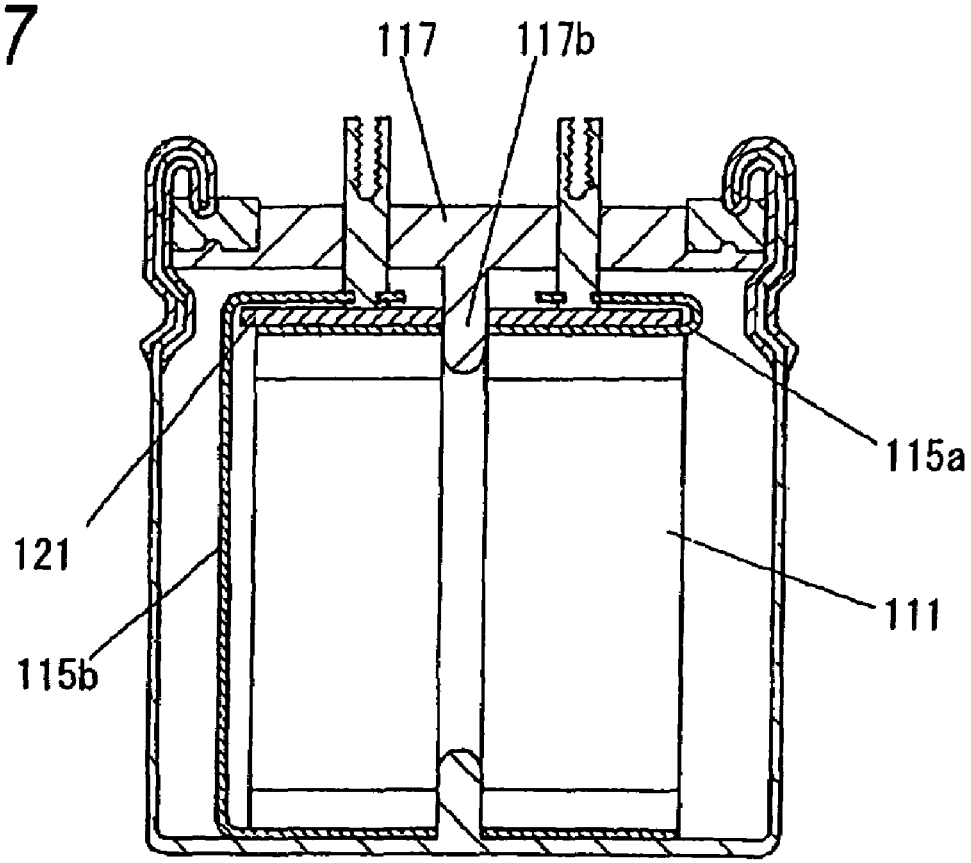
FIG. 7 is a cross-sectional view showing the construction of a third embodiment of a capacitor of the invention.

FIG. 7 is a cross-sectional view showing the construction of a third embodiment of a capacitor of the invention, and this embodiment is similar in construction to the second embodiment except that an electrically-insulating plate 121 is provided between the lead-out leads 115a and 115b of the second embodiment.

With this construction, the short-circuiting between the lead-out leads 115a and 115b due to mechanical vibration is prevented, so that the capacitor of excellent insulating properties can be obtained.

Figure 8:
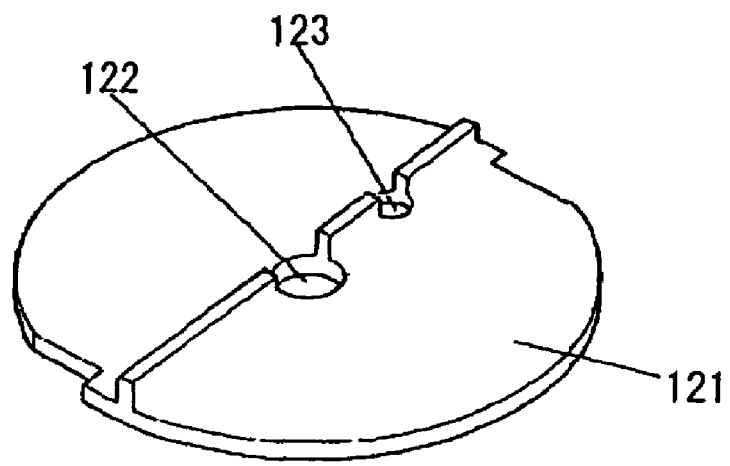
FIG. 8 is a perspective view showing the construction of an electrically-insulating plate of the third embodiment.

As shown in FIG. 8, a hole 122 for the passage of the projection 117b of the opening-sealing plate 117 therethrough is formed through a central portion of this electrically-insulating plate, and also a communication hole 123 for pouring a drive electrolyte is formed through the electrically-insulating plate. By doing so, the capacitor element 111 can be more positively fixed, and also the lead-out leads 115a and 115b can be fixed.

By applying an insulating tape to the surface of the lead-out lead 115b to cover the same, the insulation can be made more positive.

Fourth Embodiment

Figure 9:
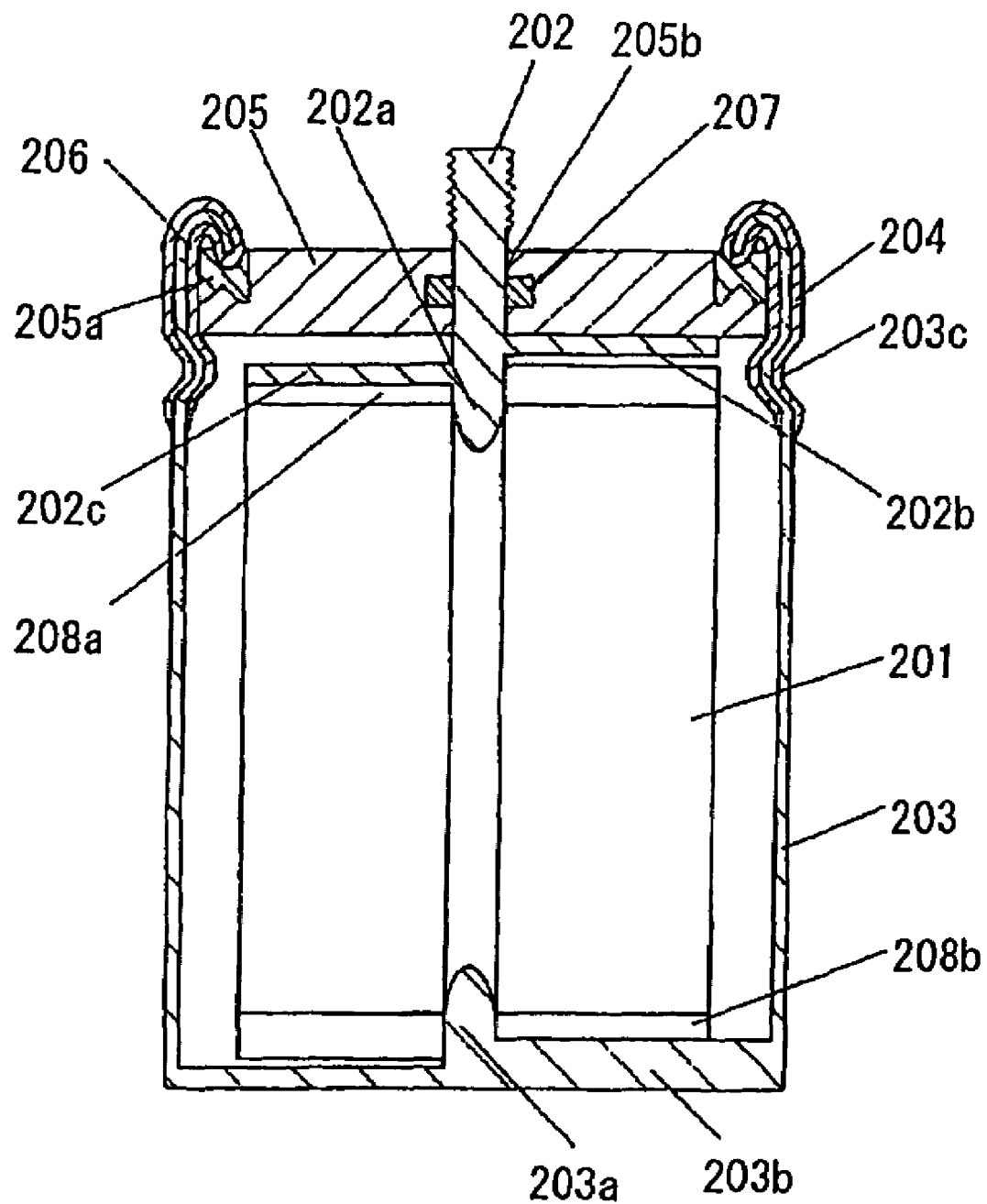
FIG. 9 is a cross-sectional view showing the construction of a fourth embodiment of a capacitor of the invention.
Figure 10:
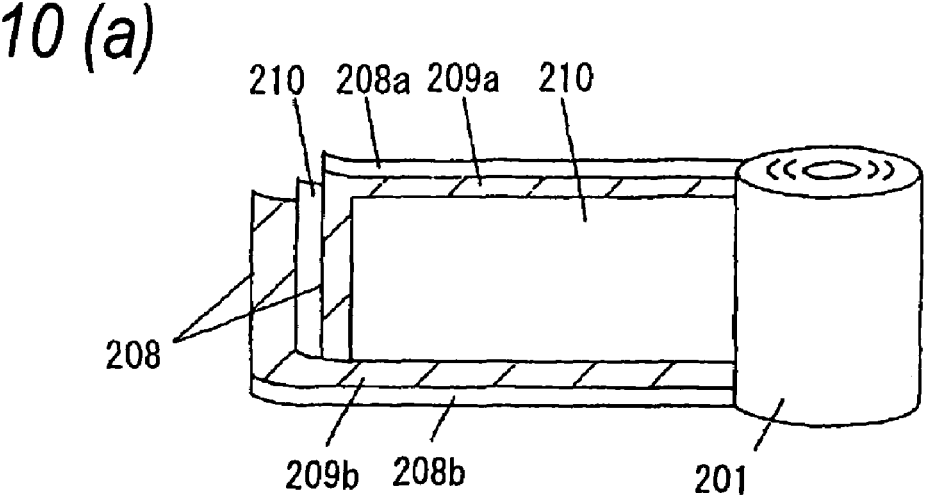
FIG. 10(*a*) is an developed, perspective view of a capacitor element thereof, and FIG. 10(*b*) is a perspective view thereof.
Figure 10:
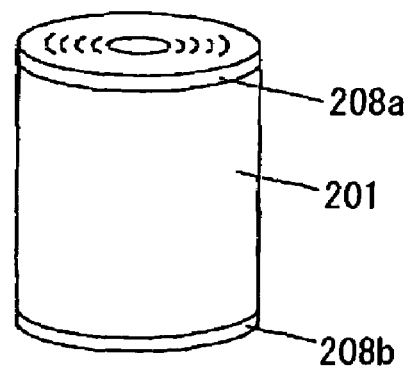
Figure 11:
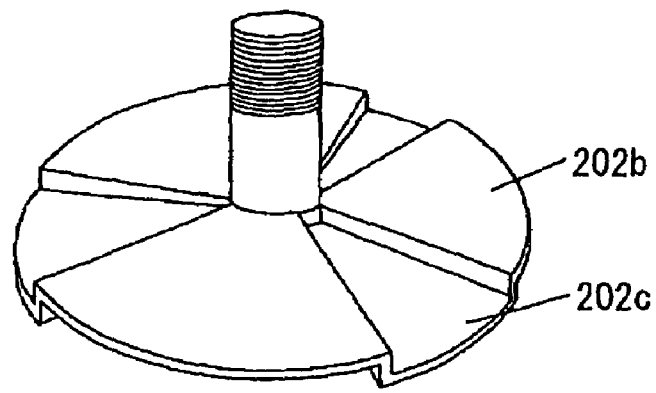
FIG. 11 is a perspective view of a current-collecting plate of the fourth embodiment.

FIG. 9 is a cross-sectional view showing the construction of a fourth embodiment of a capacity of the invention, FIGS. 10(a) and 10(b) are a developed, perspective view and a perspective view of a capacitor element employed in this capacitor, and FIG. 11 is a perspective view of a current-collecting plate employed in this capacitor. In FIG. 9, reference numeral 201 denotes the capacitor element, and reference numeral 202 denotes the current-collecting plate having an external connection terminal electrically connected to one electrode end surface 208a of the capacitor element 201. As shown in FIG. 11, this current-collecting plate 202 include concave portions 202b for easily passing a drive electrolyte therethrough, and convex portions 202c electrically connected to the electrode end surface 208a of the capacitor element 201. A projection 202a for positioning the capacitor element 201 is also formed on this current-collecting plate 202 (see FIG. 9).

Reference numeral 203 denotes a tubular metallic casing with a closed bottom, and a projection 203a for positioning the capacitor element 201, convex portions 203b electrically joined to an electrode end surface 208b of the capacitor element 201, and drive electrolyte-passing concave portions 203c for enabling the drive electrolyte to be impregnated in the capacitor element 201 are formed on an inner bottom surface of the metallic casing 203.

Reference numeral 204 denotes an electrically-insulating layer covering at least a region extending from an open end of the metallic casing 203 to a recess provided for fixing an opening-sealing plate 205. Reference numeral 205 denotes the opening-sealing plate sealing the opening of the metallic casing 203, and this opening-sealing plate 205 includes an annular projection 205a formed on an outer surface thereof at a peripheral edge portion thereof, and a through hole 205b formed through a central portion thereof. Reference numeral 206 denotes a rubber-like elastic member provided at the opening-sealing plate 205, and reference numeral 207 denotes a sealing member provided in the through hole in the opening-sealing plate 205.

In the capacitor element 201, polarizable electrode layers 209a and 209b, each composed of a mixture comprising at least activated carbon, a binding agent and an electrically-conducting agent, are formed in such a manner that the electrode end surfaces 208a and 208b of a pair of electrodes 208 project in opposite directions, respectively as shown in FIGS. 10(a) and 10(b). The pair of electrodes 208 are wound into a roll, with separators 210 interposed therebetween, and by doing so, the capacitor element 201 as shown in FIG. 10(b) can be obtained.

The convex portions 202c of the current-collecting plate is held against the electrode end surface 208a of the capacitor element 201, so that the electrode end surface 208a is partially swaged, and a laser beam is applied to the swaged portion in a direction from the opening-sealing plate 205 toward the capacitor element 201 to join the current-collecting plate 202 to the electrode end surface 208a, and by doing so, the joining can be effected positively.

Similarly, the convex portions 203b on the inner bottom surface of the metallic casing 203 is held against the electrode end surface 208b of the capacitor element 201, so that the electrode end surface 208b is partially swaged.

In the capacitor of this fourth embodiment, the side surface of the opening-sealing plate 205 is held in intimate contact with an inner side surface of the metallic casing 203, and therefore the drive electrolyte will not move along the inner side surface of the metallic casing 203, and besides even when the metallic casing 203 is a cathode, an electrochemical reaction of the water content of the drive electrolyte will not occur since the inner side of the sealed opening portion is insulated, and therefore the reliability of the sealing can be enhanced during a long-term use.

And besides, the projections 202a and 203a are formed on the current-collecting plate 202 and the inner bottom surface of the metallic casing 203, respectively, and the positioning and/or fixing of the capacitor element 201 are effected by these projections 202a and 203a, and therefore even when vibrations are applied to the capacitor from the exterior, stresses for the electrode end surfaces 208a and 208b of the capacitor element 201 can be reduced, and therefore the vibration-withstanding ability of the product can be enhanced, and also even when heat is generated within the capacitor during use, the ability of radiating heat to the exterior can be enhanced.

On the other hand, when there is provided a construction in which the metallic casing 203 is not provided with the electrically-insulating layer 204, hydroxide ions are produced at the sealed opening portion of the metallic casing 203 as a result of electrochemical reaction of the water content of the drive electrolyte since the metallic casing 203 is the cathode, and the electrolyte exhibits a higher alkalinity due to the action of the hydroxide ions and positive ions of the electrolyte. The drive electrolyte, exhibiting the alkaline nature, moves along the inner side surface of the metallic casing 203 to deteriorate the rubber-like elastic member 206 held in contact with the open end portion, thereby lowering the sealing performance.

In FIG. 9, examples of means for joining the current-collecting plate 202 to the electrode end surface 208a, as well as means for joining the inner bottom surface of the metallic casing 203 to the electrode end surface 208b, include metallizing, welding, brazing and bonding employing an electrically-conductive adhesive.

In the case where laser welding among welding means is used, a laser beam is irradiated in a direction from the current-collecting plate 202 toward the electrode end surface 208a to effect the joining, and also a laser beam is irradiated in a direction from the outside of the bottom of the metallic casing 203 toward the electrode end surface 208b to effect the joining. In this case, when a surface treatment such for example as chemical etching is applied to that surface of the current-collecting plate 202, facing the opening-sealing plate 205, and also to the outer surface of the bottom of the metallic casing 203 in order to enhance the absorption of the laser beam, the absorption of the laser beam can be enhanced, and therefore the welding can be effected with low energy, and the time period of irradiation of the laser beam is shortened, so that the productivity can be enhanced.

The capacitor of this fourth embodiment can be used as an electric double-layer capacitor utilizing an electric double layer formed at an interface of the polarizable electrode layers 209a and 209b, and this electric double-layer capacitor can be used as a device for automotive electrical equipments which is required to have a large capacity and also to be reliable for a long period of time.

In the case where an electrode foil, composed of a metal foil having a metal oxide film formed on a surface thereof, is used as one of the pair of flat sheet-like electrodes 208a of the capacitor element 201 serving as an anode, while a surface-roughened metal foil is used as the other electrode serving as a cathode, and the metal foil material is aluminum, then this capacitor can be used as an aluminum electrolytic capacitor, and can be used mainly for an inverter circuit requiring high ripple current, and as compared with conventional aluminum electrolytic capacitors, this capacitor is reliable for a longer period of time, and also reduces the amount of heat generated from the product upon application of a large current.

Fifth Embodiment

Figure 12:
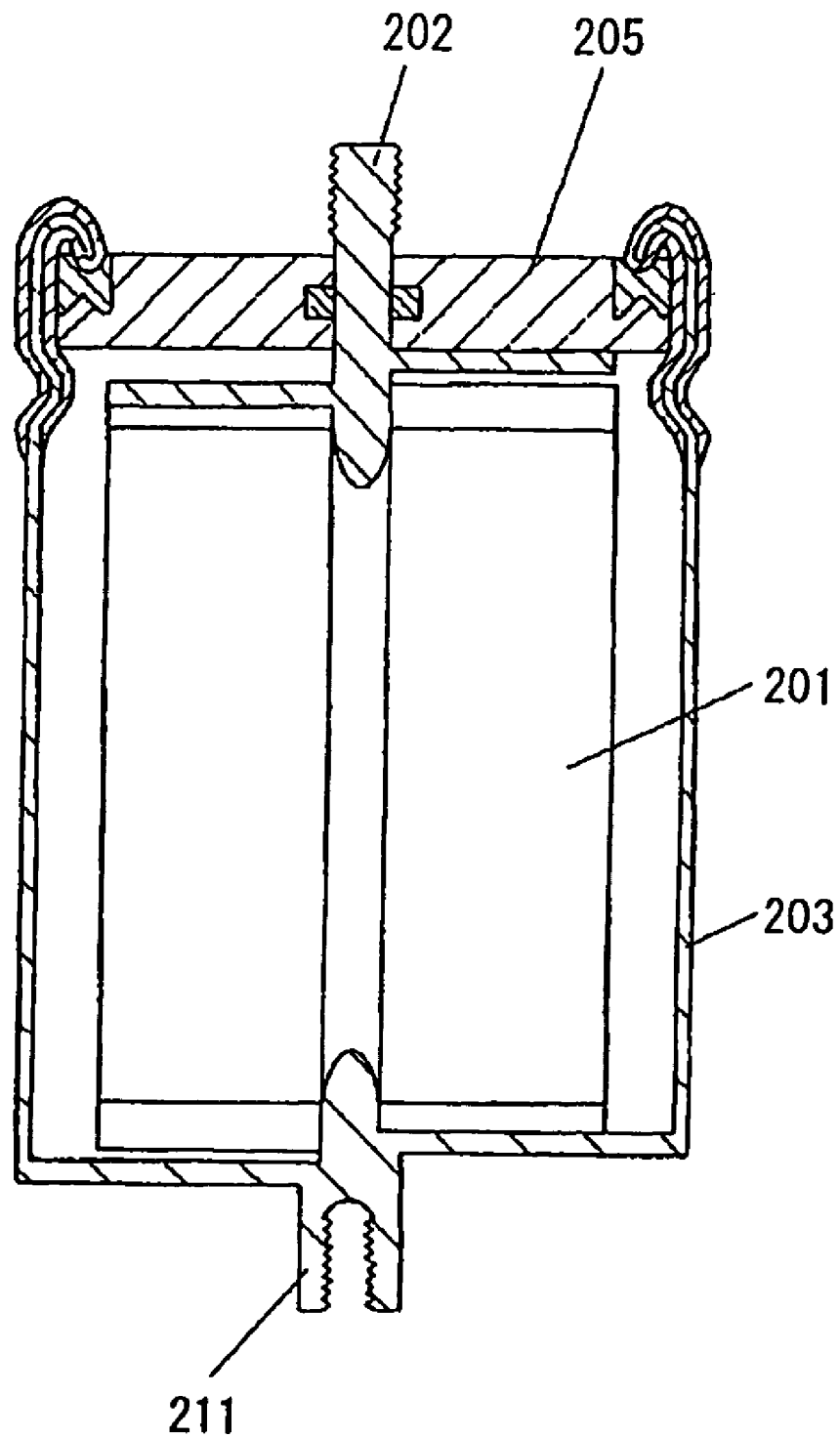
FIG. 12 is a cross-sectional view showing the construction of a fifth embodiment of a capacitor of the invention.

FIG. 12 is a cross-sectional view showing the construction of a fifth embodiment of a capacitor of the invention, and this embodiment is similar in construction to the fourth embodiment except that an external connection terminal 211 is provided at the outer bottom surface of the metallic casing 203 of the fourth embodiment.

With this construction, the capacitors can be easily and positively connected together.

For example, the external connection terminal 211 has a cylindrical shape having a threaded portion formed on an outer surface thereof, or a flat plate-shape having a mounting hole formed in a central portion thereof, and a suitable one is selected according to conditions of use of the product.

Sixth Embodiment

Figure 13:
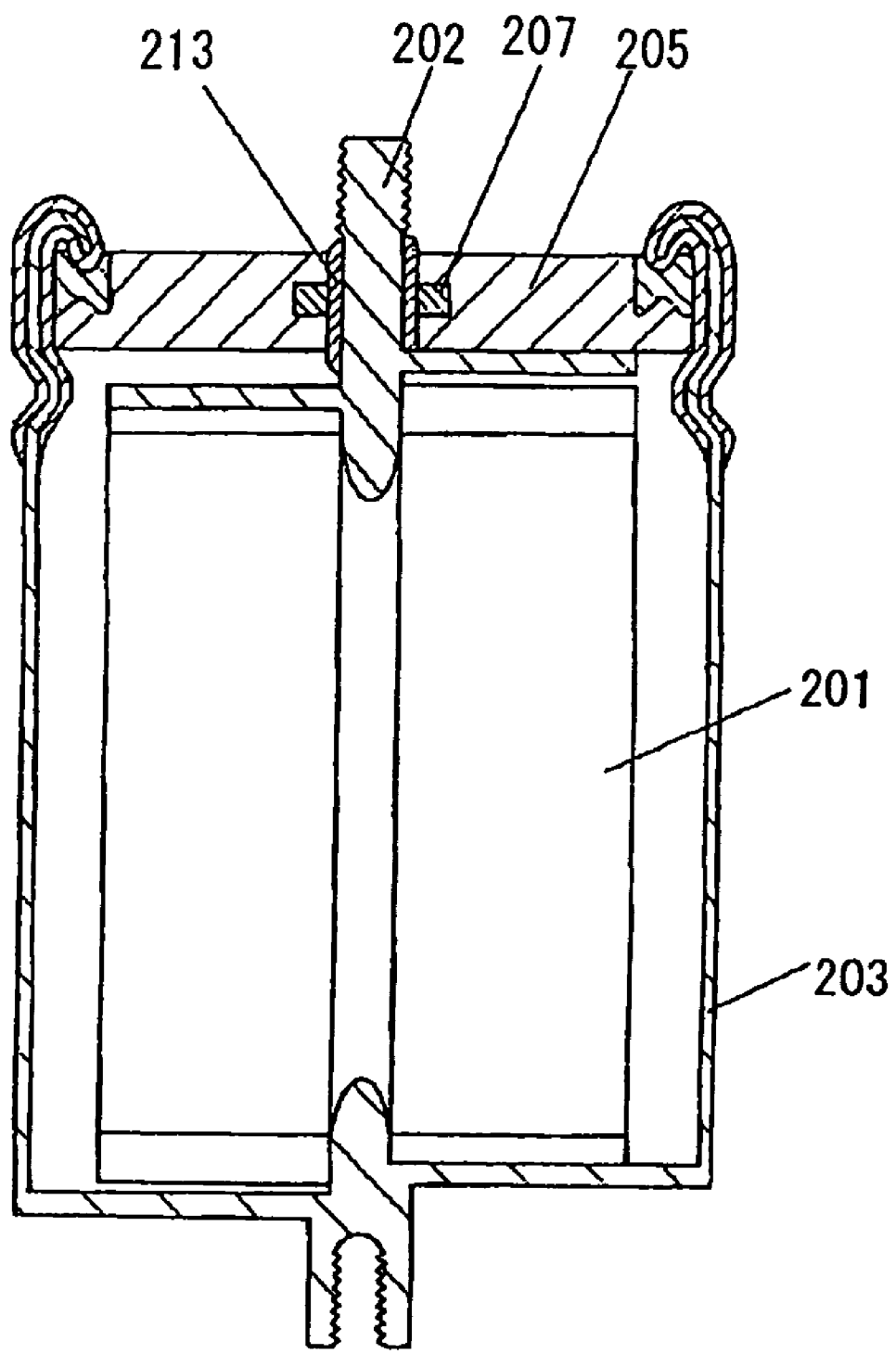
FIG. 13 is a cross-sectional view showing the construction of a sixth embodiment of a capacitor of the invention.

FIG. 13 is a cross-sectional view showing the construction of a sixth embodiment of a capacitor of the invention, and this embodiment is similar in construction to the fifth embodiment except that an electrically-insulating layer 213 is formed on that portion of the external connection terminal of the current-collecting plate 202 held in contact with the through hole portion 205 in the opening-sealing plate 205 of the fifth embodiment.

Here, it is assumed that that electrode end surface of the capacitor element 201, facing the current-collecting plate 202, is an anode surface, while the other end surface of the capacitor element 201 is a cathode surface, and when for example, tetraethylammonium fluoroborate is used as a solute of the drive electrolyte, tetrafluoroborate anions which are negative ions in the drive electrolyte approach the current-collecting plate 202 serving as the anode, and a reaction, represented by the above (Chemical Formula 1), occurs, and then hydronium ions are produced by a reaction represented by the above (Chemical Formula 2), so that the drive electrolyte exhibits an acid nature.

The electrically-insulating layer 213 is formed on the external connection terminal of the current-collecting plate 202 as shown in FIG. 13, and by doing so, the acid component of the drive electrolyte is prevented from moving along the surface of the external connection terminal, so that the sealing member 207, provided in the through hole in the opening-sealing plate 205, is prevented from deterioration. And besides, the production of hydronium ions in the vicinity of this portion is prevented, and therefore the chemical deterioration of the sealing member 207, comprising a rubber material as a main component, is suppressed, thereby achieving an advantage that the reliability of the sealing can be enhanced during a long-term use.

Seventh Embodiment

Figure 14:
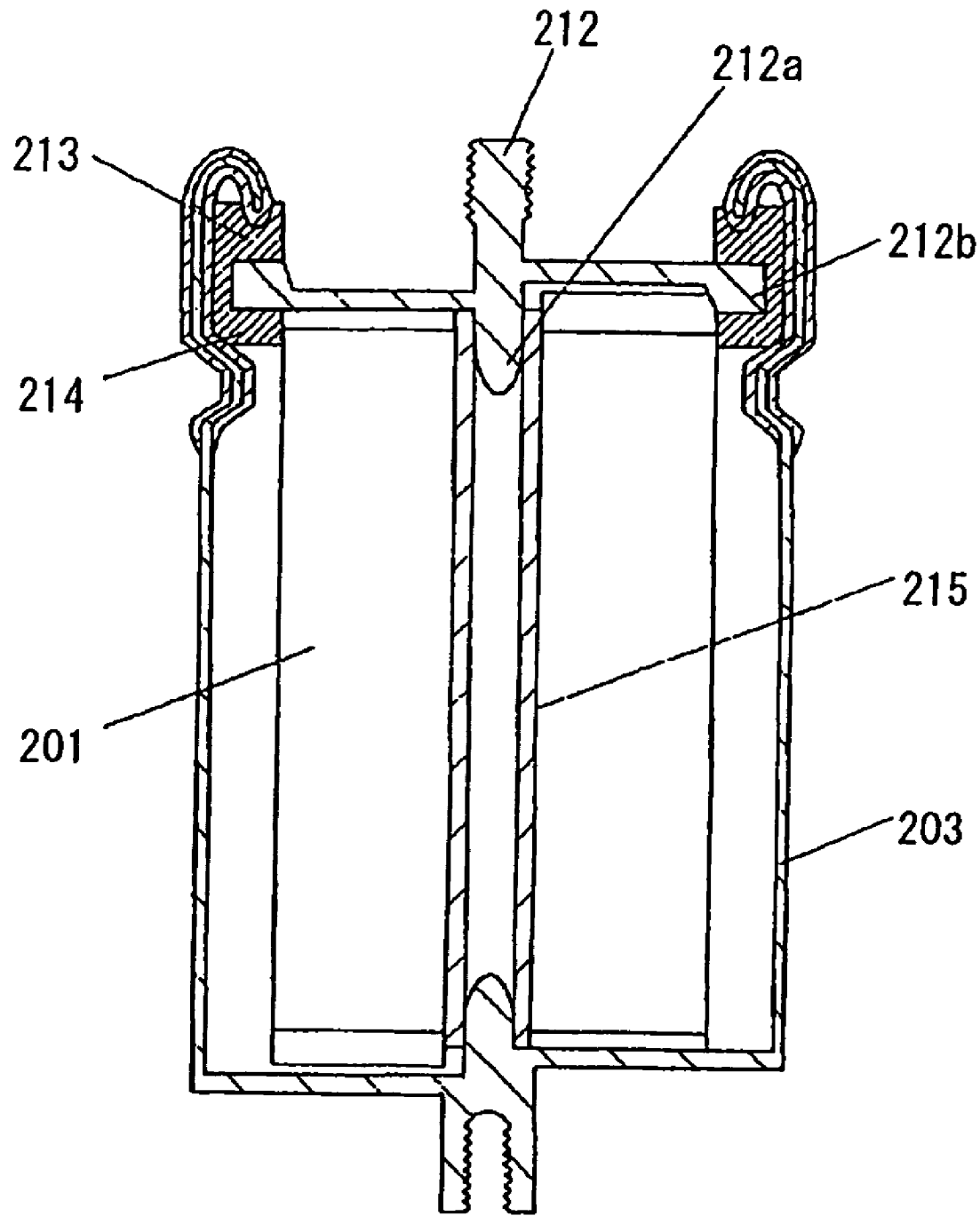
FIG. 14 is a cross-sectional view showing the construction of a seventh embodiment of a capacitor of the invention.

FIG. 14 is a cross-sectional view showing the construction of a seventh embodiment of a capacitor of the invention, and instead of the current-collecting plate 202 and the opening-sealing plate 205 in the fifth embodiment, an opening-sealing current-collecting plate 212, serving as a current-collecting plate and an opening-sealing plate, is used, and further a hollow core member 215 is used at a core portion of the capacitor element 201.

The opening-sealing current-collecting plate 212 includes a projection 212a for positioning and fixing the capacitor element 201, an annular convex portion 212b formed on an outer peripheral edge portion of that side thereof to be joined to the capacitor element 201, and an electrically-insulating layer (not shown) provided around this convex portion.

For sealing the opening of the metallic casing 203 with the opening-sealing current-collecting plate 212, the opening-sealing current-collecting plate 212 is mounted in the opening, with the outer peripheral edge portion of this plate gripped by rubber-like elastic members 213 and 214 of an L-shaped cross-section, thereby sealing the opening.

The pair of electrodes and the separators can be tightly wound on the hollow core member 215 provided at the core portion of the capacitor element 201, and the weaving of the roll is reduced, so that the distance between the electrodes can be shortened, and therefore an internal resistance of the capacitor can be decreased.

And besides, even when vibrations are applied to the capacitor from the exterior, stresses for the electrode end surfaces of the capacitor element 201 can be reduced, so that the vibration-withstanding ability of the product can be enhanced.

Metal can be used for the hollow core member 215, in which case its metal portion is held in contact with the opening-sealing current-collecting plate 212 or the metallic casing 203. In this case, even when heat is generated within the capacitor during use, this heat can be radiated to the exterior via the opening-sealing current-collecting plate 212 or the metallic casing 203.

In the capacitor of this seventh embodiment, the opening-sealing current-collecting plate 212 serves as the opening sealing plate 205 and the current-collecting plate 202 of the fifth embodiment, and therefore the through hole is not formed through the sealing plate 205, so that the reliability of the sealing can be enhanced. And besides, the height can be much reduced, and also the number of the component parts can be reduced.

Eighth Embodiment

Figure 15:
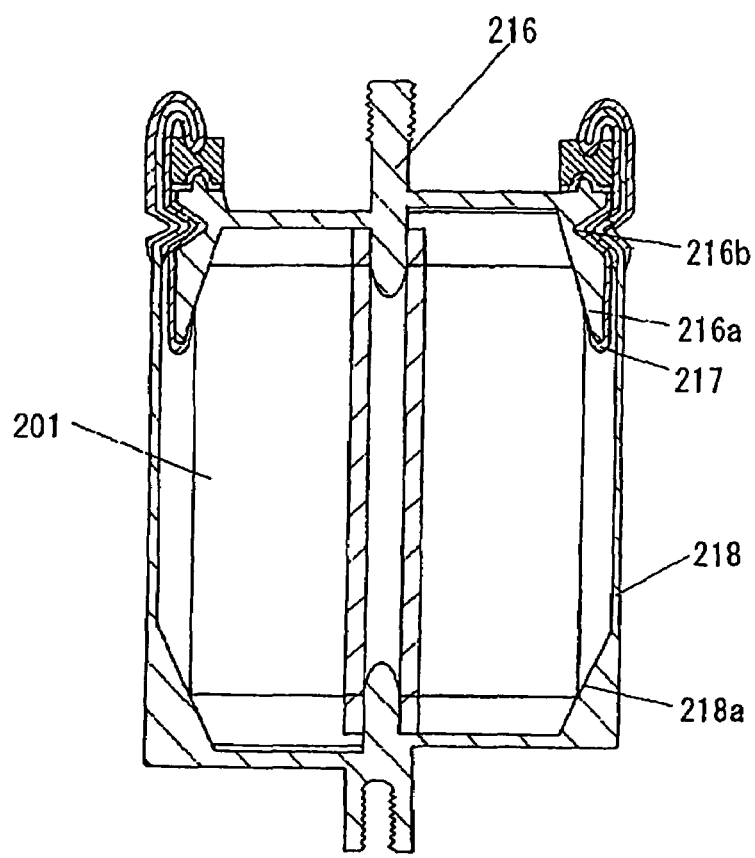
FIG. 15 is a cross-sectional view showing the construction of an eighth embodiment of a capacitor of the invention.

FIG. 15 is a cross-sectional view showing the construction of an eighth embodiment of a capacitor of the invention, and in this capacitor, the metallic casing 203 and the opening-sealing current-collecting plate 212 of the seventh embodiment are formed into different shapes. In this Figure, reference numeral 216 denotes an opening-sealing current-collecting plate having an external connection terminal electrically connected to one electrode end surface 208a of the capacitor element 201, reference numeral 216a denotes an annular convex portion formed on an outer peripheral portion of that side of the opening-sealing current-collecting plate 216 to be connected to the capacitor element 201, reference numeral 216b denotes a recess formed in a side surface of the opening-sealing current-collecting plate 216 for the purpose of fixing this plate 216, and reference numeral 217 denotes an electrically-insulating layer formed around the annular convex portion formed on the outer peripheral portion of the opening-sealing current-collecting plate 216.

Reference numeral 218 denotes a metallic casing, and a tapering thickened wall portion 218a is formed on an inner bottom surface of this metallic casing 218 and more specifically at a region including an inner side surface and inner bottom surface of the metallic casing 218. The angle of the above tapering (toward the center of the inner bottom surface) with respect to the inner side surface of the metallic casing 218 is in the range of between 5° and 85°.

In the capacitor of this eighth embodiment, the sealing by the opening-sealing current-collecting plate 216 can be more enhanced, and there can be obtained the capacitor which is reliable during a long-term use.

And besides, the opposite electrode end surfaces of the capacitor element 201 can be easily brought into a gathered condition by the annular convex portion 216a, formed at the outer peripheral portion of the opening-sealing current-collecting plate 216, and the tapering thickened wall portion 218a formed at the region including the inner side surface and inner bottom surface of the metallic casing 218, and therefore a variation in connecting resistance, developing between the capacitor element 201 and the metallic casing 218, can be reduced to a lower level, so that the stable capacitor can be obtained.

Ninth Embodiment

Figure 16:
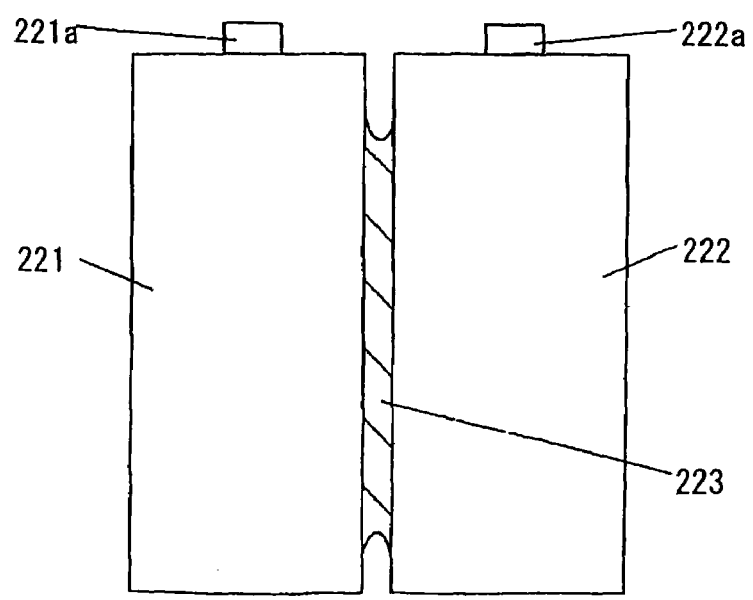
FIG. 16 is a cross-sectional view showing a method of connecting capacitors according to a ninth embodiment of a capacitor of the invention.

FIG. 16 is a side-elevational view showing a method of connecting capacitors according to a ninth embodiment of the invention.

In this Figure, reference numerals 221 and 222 denote capacitor bodies, respectively, reference numerals 221a and 222a denote external connection terminals of the capacitors 221 and 222, respectively, and reference numeral 223 denotes a brazed portion or a welded portion.

The capacitor bodies 221 and 222 are capacitors having the construction shown in the fourth embodiment. With respect to the polarity of the capacitors, the external connection terminal 221a of the capacitor 221 is positive, while the external connection terminal 222a of the capacitor 222 is negative (The polarity of the external connection terminals 221 a and 222a can be reversed).

In this method of connecting the capacitors in series, a drive electrolyte will not leak from each of the capacitors 221 and 222, and besides the capacitor bodies 221 and 222 can be easily connected together by the brazed portion or the welded portion, and therefore the efficiency of the connecting operation can be markedly enhanced.

In a brazing method, electrically-conductive silver paint is coated on a portion of the side surface of the metallic casing, and then the capacitors are fixed together with the coated silver paint held between their metallic casings.

With respect to a welding method, the connection between the metallic casings is effected by the frictional stirring bonding in which the material is softened by frictional heat generated between the metallic casing and a tool, and at the same time the material is mixed by spinning the tool, thereby effecting the joining.

Unlike conventional arc welding and laser welding, this frictional stirring bonding can achieve the firm bonding without dissolving the material, and therefore the deformation and distortion after the joining are small, and besides a joint defect is little, and therefore a defective portion will not develop in the metallic casing, so that a drive electrolyte within the capacitor will not leak out.

Tenth Embodiment

Figure 17:
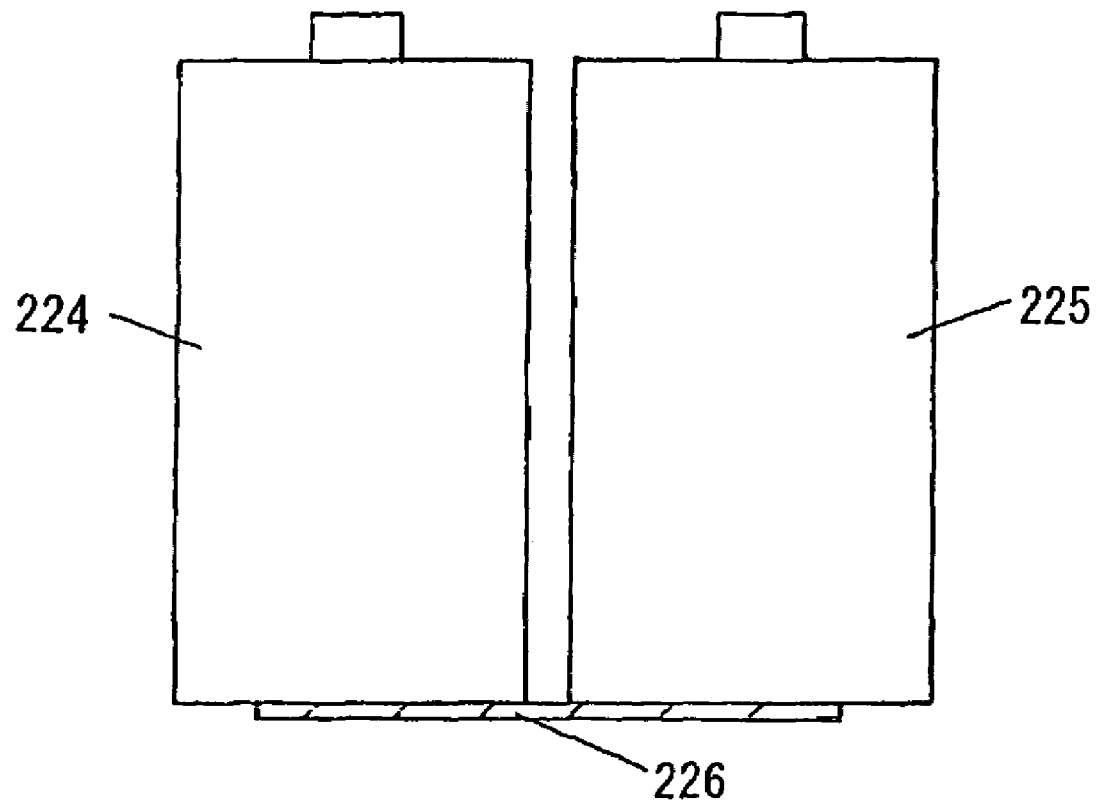
FIG. 17 is a side-elevational view showing a method of connecting capacitors according to a tenth embodiment of the invention.
Figure 18:
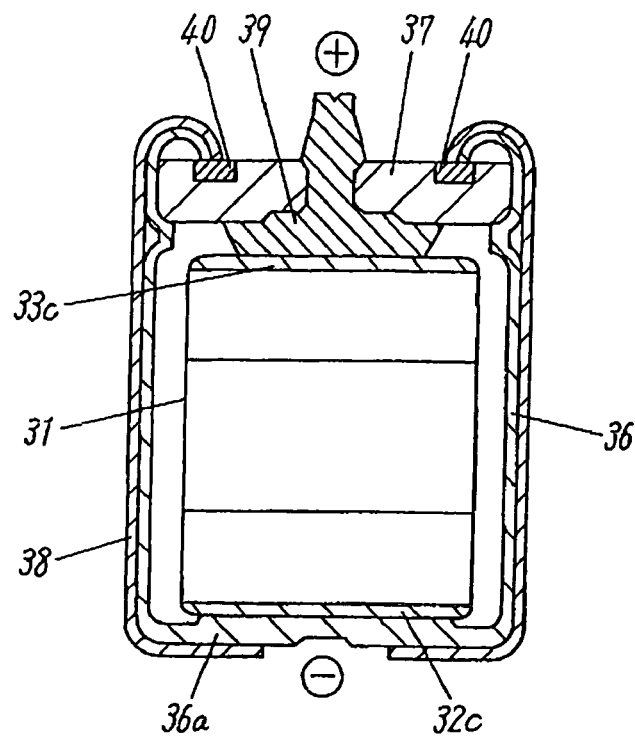
FIG. 18 is a cross-sectional view showing the construction of a conventional capacitor.
Figure 19:
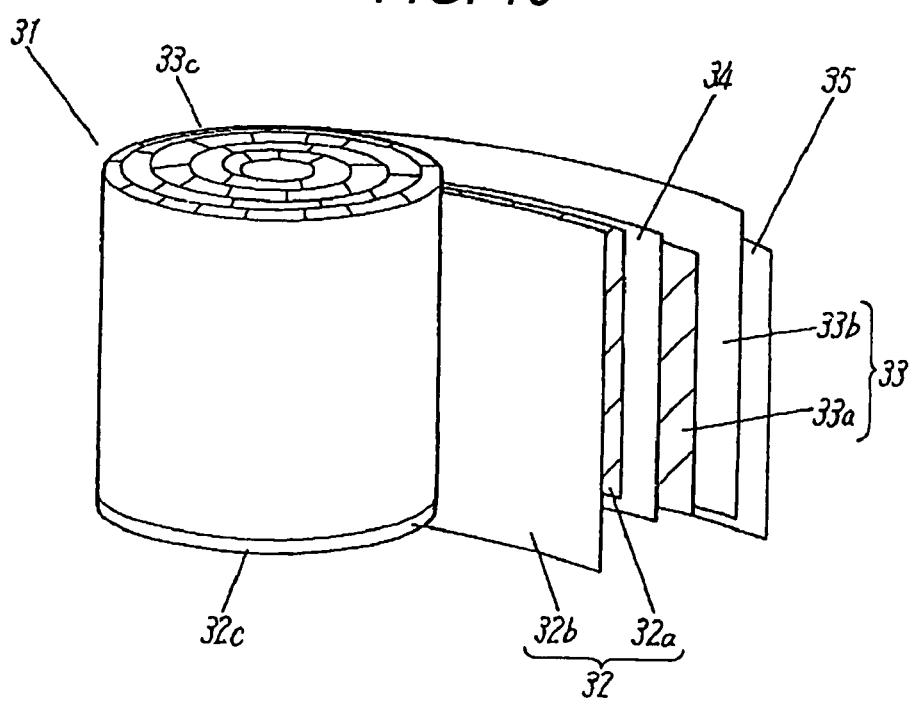
FIG. 19 is a perspective view of a capacitor element employed in the above capacitor.

FIG. 17 is a side-elevational view showing a method of connecting capacitors according to a tenth embodiment of the invention. In this Figure, reference numerals 224 and 225 denote capacitor bodies, respectively, and reference numeral 226 denotes a connecting member.

The capacitor bodies 224 and 225 are capacitors having the construction shown in the fourth embodiment.

In the capacitor connecting method of this tenth embodiment, flat bottom surfaces of the capacitor bodies 224 and 225 and a flat surface of the connecting member 226 are superposed together, and are brazed to each other, so that a wide connection area can be secured. Therefore, an electric resistance of the connected portion is low, and when the capacitors are used while applying a large current, the generation of heat at the connected portion can be suppressed.

In the case where the flat bottom surfaces of the capacitor bodies 224 and 225 and the flat surface of the connecting member 226 are superposed together, and inert gas arc welding is applied thereto, these surfaces are connected together by metallic bond, and therefore even when mechanical stresses are applied to the serially-connected capacitors, the connected portion will not broken, and the cutting of the wiring will not occur. And besides, no oxide is present in the connecting portions connected together by the metallic bond, and therefore there is achieved an effect of reducing the degradation of an electric resistance of the connecting member 226.

Although the present invention has been described in detail by way of the specific embodiments, it will be clear to those skilled in the art that various changes and modifications can be added without departing from the spirits and scope of the invention.

The present Application is based on Japanese Patent Application No. 2003-075675 filed on Mar. 19, 2003 and Japanese Patent Application No. 2003-075677 filed on Mar. 19, 2003, and the contents thereof are incorporated herein as a reference.

INDUSTRIAL APPLICABILITY

As described above, the capacitor of the present invention comprises the hollow capacitor element formed by rolling the pair of flat sheet-like electrodes, with the separators interposed therebetween, the bottom-closed metallic casing receiving the capacitor element and the drive electrolyte therein, and the opening-sealing plate sealing the opening portion of the metallic casing, the opening-sealing plate having the external connection terminal, and the rubber-like elastic member is provided on the surface of the opening-sealing plate at the peripheral edge portion thereof, and the electrically-insulating layer covering the region extending from the open end of the metallic casing to the recess provided for fixing the opening-sealing plate, and the rubber-like elastic member is pressed by the open end portion of the metallic casing. With this construction, the side surface of the opening-sealing plate can be held in intimate contact with the inner side surface of the metallic casing, and therefore the drive electrolyte will not move along the inner side surface of the metallic casing, and besides the inner side of the sealed opening portion of the metallic casing is insulated by the electrically-insulating layer, and therefore an electrochemical reaction of the water content of the drive electrolyte will not occur, and therefore there is achieved an advantage that the reliability of the sealing can be enhanced for a long period of time.

And besides, heat, generated within the capacitor during the charging and discharging of the capacitor, can be easily radiated to the metallic casing via the projecting end surface portion of the capacitor element, and therefore there is achieved an advantage that heat can be easily radiated to the exterior.

The capacitor of the invention comprises the hollow capacitor element formed by rolling the pair of flat sheet-like electrodes, with the separators interposed therebetween, in such a manner that the end surfaces of the electrodes project in opposite directions, respectively, and the bottom-closed metallic casing which receives the capacitor element and the drive electrolyte, and has one of the electrode end surfaces of the capacitor element electrically connected to the inner bottom surface thereof, the current-collecting plate having the external connection terminal electrically connected to the other electrode end surface of the capacitor element, and the opening-sealing plate which seals the opening portion of the metallic casing in such a manner that the external connection terminal of the current-collecting plate extends through the opening-sealing plate, and the electrically-insulating layer is formed on the inner surface of the metallic casing to cover at least the region extending from the open end of the metallic casing to the recess provided for fixing the opening-sealing plate, and the rubber-like elastic member is pressed by the open end portion of the metallic casing. With this construction, the inner surface of the metallic casing in the vicinity of the opening portion thereof is insulated, and an alkalinity is not exhibited in the vicinity of the opening portion, and the chemical deterioration of the rubber-like elastic member is suppressed, and the reliability of the sealing can be enhanced during a long-term use.

And besides, heat, generated within the capacitor during the charging and discharging of the capacitor, can be easily radiated to the metallic casing via the projecting end surface portions of the capacitor element, and therefore there is achieved an advantage that heat can be easily radiated to the exterior.

The invention claimed is:

1. A capacitor comprising a hollow capacitor element formed by rolling a pair of flat sheet-like electrodes, with separators interposed therebetween, a bottom-closed metallic casing receiving the capacitor element and a drive electrolyte therein, and an opening-sealing plate sealing an opening portion of the metallic casing, the opening-sealing plate having an external connection terminal, wherein a rubber-like elastic member is provided on a surface of said opening-sealing plate at a peripheral edge portion thereof, and an electrically-insulating layer formed on said metallic casing to cover at least a region extending from the open end of said metallic casing to a recess provided for fixing said opening-sealing plate, and said rubber-like elastic member is pressed by the open end portion of said metallic casing.

2. The capacitor according to claim 1, in which the electrically-insulating layer is made of a polyaminoamide compound or a modified olefin resin.

3. The capacitor according to claim 1, in which electrode end surfaces of said capacitor element project in opposite directions, respectively, and one of the electrode end surfaces of the capacitor element is electrically connected to an inner bottom surface of said metallic casing, and there is provided a current-collecting plate having an external connection terminal electrically connected to the other electrode end surface of said capacitor element, and said external connection terminal of said current-collecting plate extends through said opening-sealing plate.

4. The capacitor according to claim 3, in which the current-collecting plate, having the external connection terminal, is an opening-sealing current-collecting plate which is made of metal, and serves also as the opening-sealing plate.

5. The capacitor according to claim 1 or claim 3, in which the electrically-insulating layer is made of acryl-melamine resin.

6. The capacitor according to any one of claims 1, 2 in which as a pretreatment for providing the electrically-insulating layer on the metallic casing, at least one of a degreasing treatment, a surface-roughening treatment and an oxide film-forming treatment is applied to said metallic casing.

7. The capacitor according to claim 1 or claim 3, in which said electrically-insulating layer is an anodized aluminum layer.

8. The capacitor according to claim 1 or claim 3, in which the open end portion of the metallic casing is formed into a curved shape.

* * * * *